United States Patent [19]
De Lang et al.

[11] 3,881,105
[45] Apr. 29, 1975

[54] APPARATUS FOR DETERMINING THE POSITION OF AN OBJECT IN AN ARBITRARY CROSS-SECTION OF A BEAM OF RADIATION

[75] Inventors: Hendrik De Lang, Emmasingel, Eindhoven, Netherlands; Rene Dandliker, Zug, Switzerland

[73] Assignee: U.S. Philips Corporation, New York, N.Y.

[22] Filed: Sept. 14, 1973

[21] Appl. No.: 397,610

Related U.S. Application Data
[63] Continuation of Ser. No. 93,341, Nov. 27, 1970, abandoned.

[30] Foreign Application Priority Data
Dec. 5, 1969   Netherlands.................... 6918301

[52] U.S. Cl............ 250/225; 343/100 PE; 356/141; 356/152; 356/172
[51] Int. Cl...... G01n 21/46; G02f 1/18; H04b 7/00
[58] Field of Search ............ 250/225; 356/172, 141, 356/152; 343/100 PE

[56] References Cited
UNITED STATES PATENTS
| | | | |
|---|---|---|---|
| 2,565,213 | 8/1951 | Falkenstein.................. | 250/225 X |
| 2,998,746 | 9/1961 | Gievers........................ | 250/225 X |
| 3,117,176 | 1/1964 | Marks et al................... | 250/225 X |
| 3,272,988 | 9/1966 | Bloom et al.................. | 250/225 X |
| 3,316,799 | 6/1967 | Daley et al................... | 356/152 |
| 3,470,377 | 9/1969 | Le Febre et al............... | 356/172 |

OTHER PUBLICATIONS
Naes, R. O., "A Measuring Interferometer For High Accuracy Alignment," Applied Optics, Vol. 7, n 11, Nov. 1968, pp. 2,315-2,317.

*Primary Examiner*—James W. Lawrence
*Assistant Examiner*—T. N. Grigsby
*Attorney, Agent, or Firm*—Frank R. Trifari; Simon L. Cohen

[57] ABSTRACT

Two virtual or real spatially separated sources of coherent radiation polarized at right angles to one another and having a time-dependent complex-amplitude difference used in conjunction with a polarization-sensitivie detection system disposed in the vicinity of an object form an apparatus for determining the relative position of the object with respect to the radiation sources. Optical systems where the virtual sources of radiation are formed by passing coherent radiation having a rotating plane of polarization through a polarization dependent beam splitting device, and an electrical system where the radiation sources are two plane polarized aerials transmitting high frequency electromagnetic radiation modulated by low frequency signal sources oscillating in phase quadrature are shown.

20 Claims, 18 Drawing Figures

*INVENTORS*
HENDRIK DE LANG
RENE DANDLIKER

BY

*Frank R. ...*

AGENT

APPARATUS FOR DETERMINING THE POSITION OF AN OBJECT IN AN ARBITRARY CROSS-SECTION OF A BEAM OF RADIATION

This is a continuation, of application Ser. No. 93,341, filed Nov. 27, 1970, now abandoned.

This invention relates to an apparatus for determining the position of an object in an arbitrary cross-section of a beam of electromagnetic radiation.

In a known apparatus of the said type described in Applied Optics, 7, pages 2,315 – 2,317, the interference of light beams is utilized. The beam of light which enters a Kosters prism through a first lateral face is split by the beam splitter in the prism into two components which both emerge from the prism through a second lateral face. The sub-beams are reflected at two faces of a Porro prism- re-enter the second lateral face of the Kosters prism, are re-united in the prism and emerge from Koesters through the third lateral face. When emerging the sub-beams have an optical path difference which is proportional to the angle of incidence of the beam on the first lateral face and to the distance between the axis of symmetry of the Porro-prism and the plane of the beam splitter in the Koesters prism. This distance and hence the position in the beam may exactly be determined from the path difference.

The known apparatus has several fundamental disadvantages. First, measurement of the phase in the interference pattern is possible only if the dimensions of the detection system at right angles to the direction of the emergent beam are of the same order of magnitude as is the period of the interference pattern.

Secondly, in order to determine the phase it is necessary to compare intensity signals with one another. Especially in the case of large distance from the source of radiation, these signals are subject to fluctuations due to inhomogeneities of the medium traversed. These fluctuations impede the determination of the phase.

Thirdly, the means by which the phase is detected are not described.

It is an object of the present invention to avoid the disadvantages which attach to the known apparatus. For this purpose, it is characterized in that the radiation beam is produced by at least two virtual or real spatially separated sources of coherent radiation which are polarized at right angles to one another and have a time-dependent complex-amplitude difference, whilst a polarisation-sensitive detection system is disposed at the site of the object. The invention is based on the recognition that the polarisation condition of a light beam is substantially not influenced by fluctuations in the medium.

Embodiments of the invention will now be described, by way of example, with reference to the accompanying diagrammatic drawings, in which.

Figure 1:
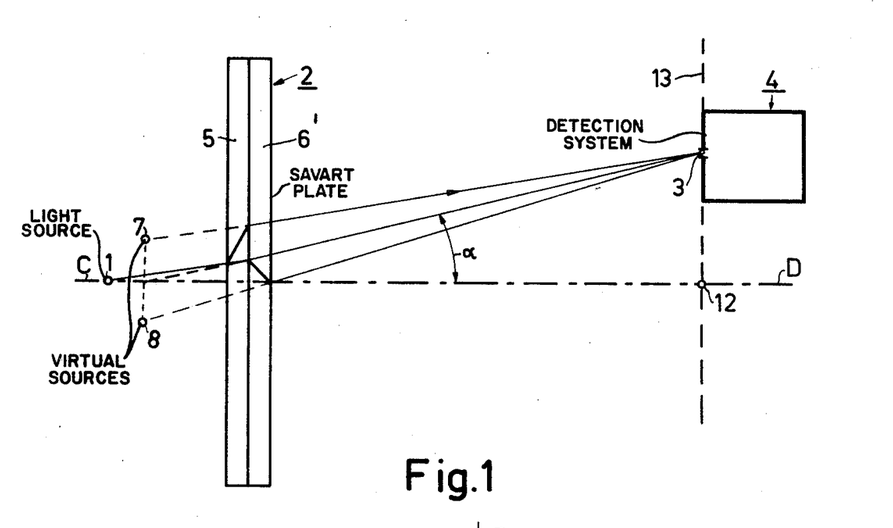
FIG. 1 shows schematically a plan view of a first embodiment of an apparatus according to the invention.
Figure 2:
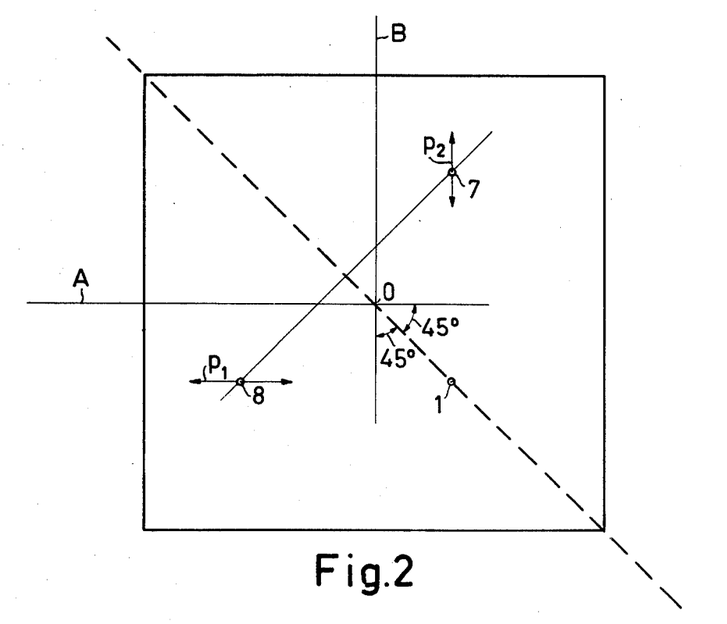
FIG. 2 shows in detail a front elevation of the apparatus shown in FIG. 1, FIGS. 3, 4 and 5 are geometrical representations illustrating the operation of the apparatus of FIG. 1.

Referring now to FIG. 1, plane-polarized light the plane of polarisation of which rotates at an angular velocity $\Omega$ emanates from a source of light 1. The light source 1 may comprise the series arrangement of a light source emitting plane-polarized light, a $\lambda/4$ plate and three electro-optical crystals, as shown in FIG. 2 of co-pending Netherlands Patent Specification No. 6,713,762 (PHN 2787) corresponding to U.S. Pat. No. 3,558,214. The light which emanates from the point source 1 falls on a Savart plate 2 and then on a narrow opening 3 in a detection system 4, The Savant plate 2 comprises the series arrangement of two birefringent uniaxial plate-shaped crystals 5 and 6 the principal sections of which are at right angles to one another, the angle between the optic axis and the crystal surface being equal in both crystals. Owing to the double refraction in the crystals two plane-polarized sub-beams polarized at right angles to one another emerge from the assembly of the two crystals. These sub-beams may be regarded as emanating from two point sources 7 and 8 which are symmetrically arranged relative to that plane through the light source 1 which is at right angles to the surface of the Savart plate 2 and at an angle of 45° to the projections of the optic axes of the crystals 5 and 6 on to the surface of the Savart plate. In FIG. 2, lines 0A and 0B are parallel to these projections. An arrow $p_1$ indicates the direction of polarisation of the light emanating from the virtual source 8 and an arrow p2 indicates the direction of polarisation of the light emanating from the virtual source 7.

In each point of the plane with respect to which the virtual light sources are symmetrically situated, for example in a point 12 (FIG. 1), the optical path difference between the orthogonally polarized sub-beams is zero. In all other points, for example, the points of the plane passing through the point 12 at right angles to an axis CD containing the light source 1 and the point 12, there is a path difference between the sub-beams which differs from zero. For small values of $\alpha$ (FIG. 1) the path difference $\Delta$ is proportional to the angle $\alpha$ : $\Delta =$ C $\alpha$. (See Francon, Optical Interferometry, page 140).

The state of polarisation of the two sub-beams in the point 3 may readily be illustrated with reference to the Poincare sphere, which represents all possible states of polarisation, cf. "Principles of Optics" by Born and Wolf (pages 30 and 31).

Figure 3:
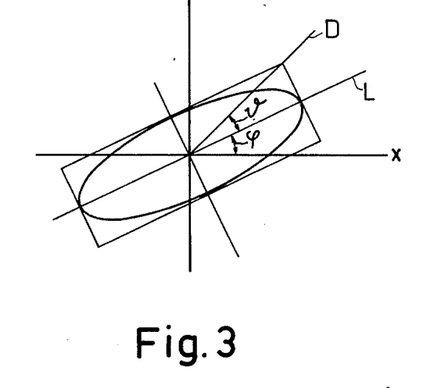

A state of polarisation P is characterized by an ellipse in the xy plane (FIG. 3) the major axis L of which is at an angle $\phi$ to the x axis, whilst the diagonal D of the circumscribed rectangle is at an angle $\theta$ to L. The axis ratio of the ellipse is given by tan $\theta$.

On the Poincare sphere (FIG. 4) the point P is characterized by the angles 2 $\phi$ and 2 $\theta$. There is a unique relationship between the state of polarisation and the associated point on the sphere.

The angle $\theta = 0°$ (plane polarized light, see FIG. 3) corresponds to points on the equator of the sphere, i.e., the equator represents all the states of plane polarisation.

Figure 4:
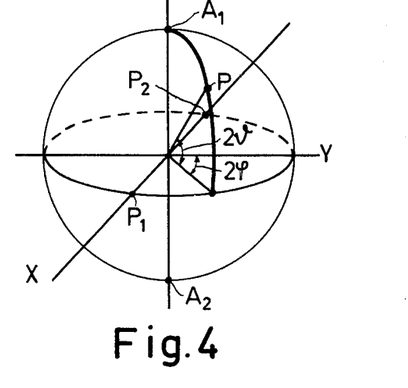

The angle $\theta = \pm 45°$ (circularly polarized light) corresponds to the poles ($A_1$ and $A_2$) of the sphere.

The ends $P_1$ and $P_2$ of the diameter $P_1 P_2$ in the equatorial plane represent the directions of polarisation of the two sub-beams. The rotation of the plane of polarisation of the light source 1 at an angular velocity $\Omega$ is shown on the sphere as a rotation about an axis in the equatorial plane at an angular velocity 2 $\Omega$.

Figure 5:
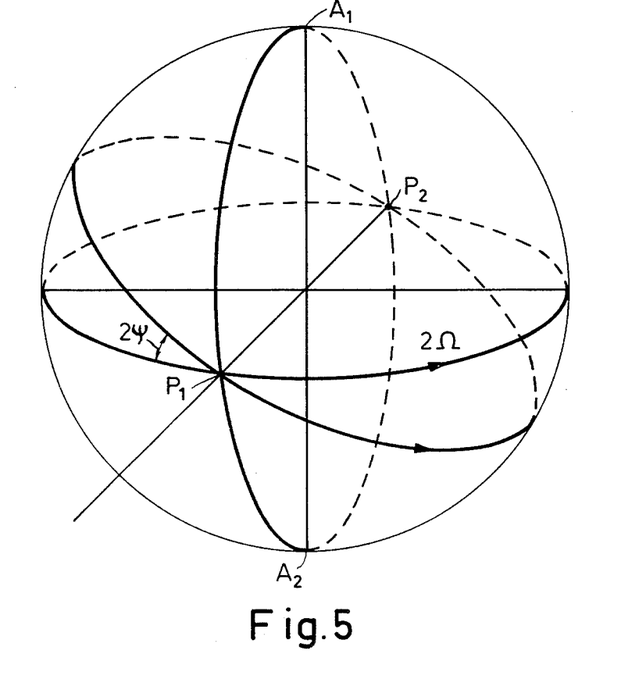

However, owing to the path difference between the sub-beams in the point 3 the rotation movement of the planes of polarisation of the two sub-beams will not take place along the equator, but along a great circle in a plane which is tilted through an angle 2 $\psi$ relative to the equatorial plane (FIG. 5). The angle 2 $\psi$ is proportional to the path difference.

Figure 6:
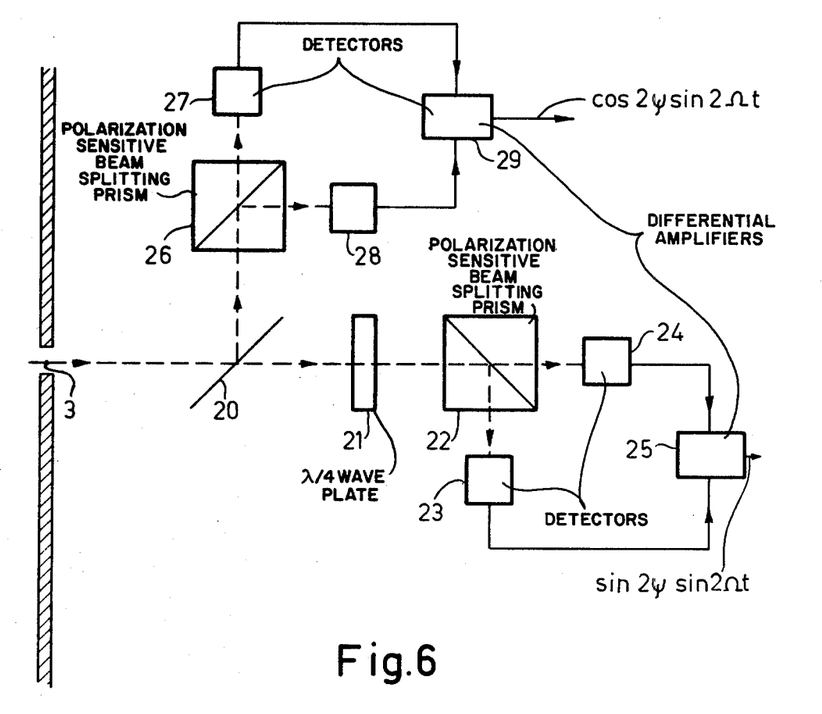
FIG. 6 shows a plan view of part of the apparatus shown schematically in FIG. 1.

The orientation of the tilted rotation plane and hence the distance of the point 3 from the axis CD is determined by detecting the light by means of a detection system 4 including polarisation-sensitive detectors. Such a detection system is shown in FIG. 6. The light passing through the opening 3 falls through an isotropic beam-splitting mirror 20 partly on a $\lambda/4$ plate 21 and partly on a polarisation-sensitive beamsplitting prism 26. The plane of incidence of the light beam falling on the beam splitting mirror 20 in the polarising-separating prism 26 is inclined at an angle of 45° to the direction of polarisation of each of the virtual light sources 7 and 8.

The $\lambda/4$ plate 21 converts the left-circularly polarized and right-circularly polarized components of the sub-beams transmitted by the prism 20 into orthogonally polarized beams, which fall on a polarisation-separating prism 22. From this prism there emerge two beams with produce electrical signals in the detectors 23 and 24, which signals are applied to a differential amplifier 25. It can be shown that the differential amplifier delivers and output signal which is proportional to sin 2 $\psi$ sin 2 $\Omega$ t.

The plane-polarized components of the subbeams which fall on the polarization-separating prism 26 are separated in the prism 26 and separately applied to detectors 27 and 28. The electric signals produced in the detectors 27 and 28 are applied to a difference amplifier 29. It can be proved that the difference amplifier 29 provides an output signal which is proportional to cos 2 $\psi$ sin 2 $\Omega$ t.

From the signals sin 2 $\psi$ sin 2 $\Omega$ t and cos 2 $\psi$ sin 2 $\Omega$ t it is simple to determine 2 $\psi$ and hence, apart from an integral multiple of one half wave length of the light from the light source 1, the position of the point 3 relative to the axis CD.

Figure 7:
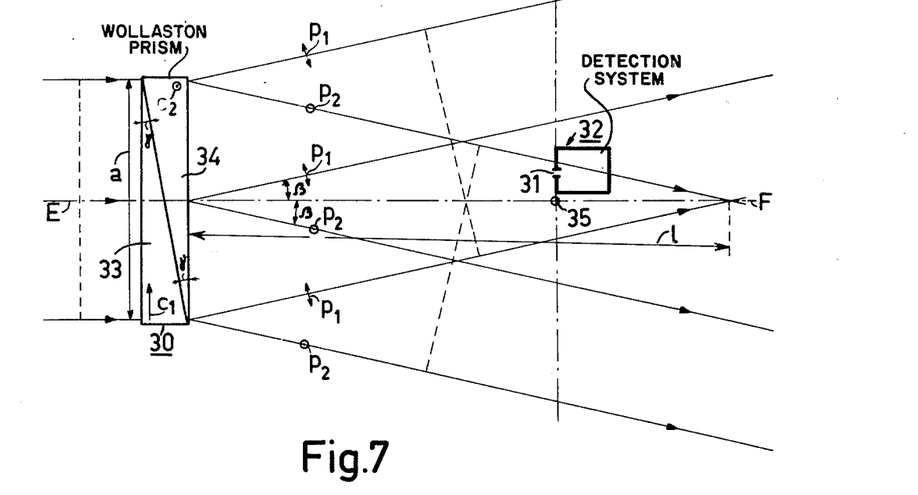
FIG. 7 shows a plan view of a second embodiment of an apparatus according to the invention.

In the apparatus shown in FIG. 7 a collimated beam of plane-polarized light the plane of polarisation of which rotates at an angular velocity $\Omega$ emanates from a source of light (not shown) and falls on a Wollaston prism 30. For the sake of simplicity, only three rays of the collimated beam of light are shown. The plane-polarized sub-beams which emerge from the Wollaston prism and the planes of polarisation of which are at right angles to one another fall on a narrow opening 31 in a detection system 32 which is identical to the detection system 4 of the apparatus shown in FIG. 1.

The Wollaston prism comprises two congruent prisms 33 and 34 of uni-axial birefringent crystals which are cemented together to form a plane-parallel plate 30. The beam which has a plane wave front and is normally incident on one of the parallel large faces of the Wollaston prism 30 is divided in this prism into two sub-beams having plane wave fronts. The directions of polarisation $p_1$ and $p_2$ of these sub-beams are at right angles to one another.

The plane wave fronts of the sub-beams are symmetrical with respect to that plane parallel to the incident collimated light beam which intersects the Wollaston prism at the area at which the component prisms 33 and 34 are equally thick. In FIG. 7, EF is the line of intersection of the said plane with the plane of the drawing. The angle between the directions of the sub-beams is indicated by 2 $\beta$.

Figure 8:
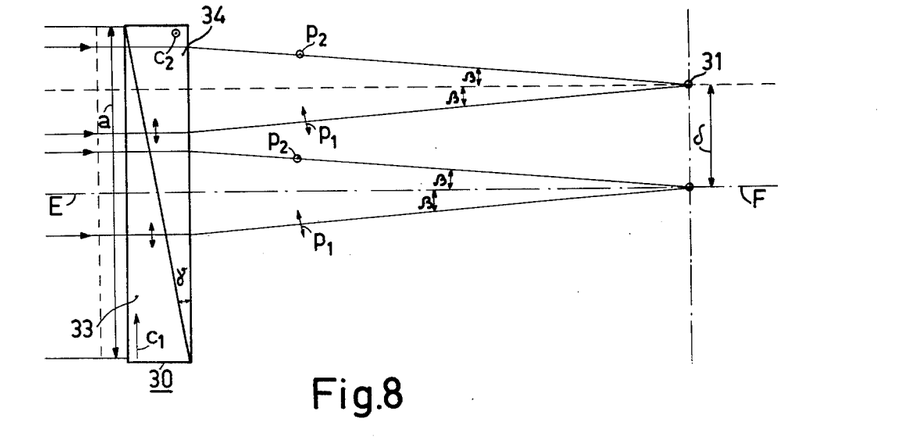
FIG. 8 shows a plan view of details of the apparatus shown in FIG. 7.

In each point of the plane of symmetry and hence in a point 35 of a line EF also the optical path difference between the sub-beams polarized at right angles to one another is zero. In points outside the plane of symmetry, for example in the narrow opening 31 of the detection system 32, there is a path difference between the sub-beams polarized at right angles to one another. This path difference $\Delta$ is proportional to the distance $\delta$ (see FIG. 8 also) of the point concerned from the line EF. For small values of $\beta$, $\Delta = 2 \delta \beta$. The value of $\beta$ and hence the value of $\Delta$ is determined by the refracting angle $\gamma$ of the component prisms and by the choice of the birefringent material used for the component prisms.

On the Poincare sphere the path difference may again be represented by tilting the plane of the rotation movement of the planes of polarisation about the axis $P_1P_2$, see FIG. 5. The position of the plane of rotation is detected in the same manner as in the apparatus shown in FIG. 1. That is why the detection system 32 is analogous to the detection system 4.

The tilting movement of the plane of rotation through an angle 2 $\psi$ is directly proportional to $\delta$, because the path difference $\Delta$ is proportional both 2 $\psi$ and to $\delta$, The distance between the Wollaston prism 30 and the plane through the opening 31 at right angles to the axis EF cannot be made larger than the distance (l in FIG. 7) through which the plane wave fronts of the two sub-beams still interact. This distance l is proportional to the length a of the plane-parallel plate 30 and inversely proportional to $\beta$, being (see FIG. 7) l = (a/2 $\beta$).

In the apparatus shown in FIG. 1, the distance of the detection system from the Savart plate may have any desired value. However, the path difference $\Delta$ due to the transverse displacement $\delta$ is inversely proportional to the distance from the virtual sources.

In the apparatus shown in FIG. 7, the distance of the detection system from the Wollaston prism is limited. However, the path difference $\Delta$ due to a transverse displacement $\delta$ is independent of this distance.

The plane-polarized light the plane of polarization of which rotates at an angular velocity $\Omega$ and which may be regarded as emanating from two point sources 7 and 8 (FIG. 1) has an amplitude E which in vectorial form can be represented by:

$$E \alpha (\cos\Omega t, \sin\Omega t)e^{-i\omega t}$$

in which the sign $\alpha$ means: is proportional to. After the passage through the Savart plate 2 the path difference between the two beams emanating from the sources 7 and 8 gives rise to the amplitude $$E_1 \alpha (e^{i\psi} \cos\Omega t, e^{-i\psi} \sin\Omega t)e^{-i\omega t}.$$

The neutral beam-splitting mirror 20 divides the beam $E_1$ in a reflected part having an amplitude $E_2$ and a transmitted part having an amplitude $E_3$.

The amplitude of the reflected part can be represented by:

$$E_2 \alpha (e^{i\psi} \cos\Omega t, \beta_r e^{-i\psi} \sin\Omega t)e^{-i\omega t}$$

in which $\beta_r$ is the reflection coefficient of the mirror 20 ($\beta_r \leq 1$). The amplitude of the transmitted part can be represented by:

$$E_3 \alpha (e^{i\psi} \cos\Omega t, \beta_t e^{-i\psi} \sin\Omega t)e^{-i\omega t}$$

in which $\beta_t$ is the transmission coefficient of the mirror 20 ($\beta_t \leq 1$).

In the polarizing beam splitter 26 the incident light beam is split in two parts, having an amplitude $E_3$ and $E_4$ resp., the latter part being transmitted to the detector 27. The amplitudes $E_3$ and $E_4$ can be represented by:

$$E_3 \alpha (e^{i\psi} \cos\Omega t + \beta_r e^{-i\psi} \sin\Omega t)e^{-i\omega t}$$
$$E_4 \alpha (e^{i\psi} \cos\Omega t - \beta_r e^{-i\psi} \sin\Omega t)e^{-i\omega t}$$

Hence, the beam energy incident on the detector 27 is:

$$I_{27} = E_3 \times \bar{E}_3 \alpha (e^{i\psi} \cos\Omega t + \beta_r e^{-i\psi} \sin\Omega t)(e^{-i\psi} \cos\Omega t + \beta_r e^{i\psi} \sin\Omega t)$$

$$I_{27} \alpha \cos^2\Omega t + \beta_r^2 \sin^2\Omega t + \beta_r e^{2i\psi} \cos\Omega t \sin\Omega t + \beta_r e^{-2i\psi} \cos\Omega t \sin\Omega t$$

Since $$\beta_r e^{2i\psi} \cos\Omega t \sin\Omega t + \beta_r e^{-2i\psi} \cos\Omega t \sin\Omega t = 2\beta_r \cos\Omega t \sin\Omega t [(e^{2i\psi}+e^{-2i\psi})/2] \beta_r \sin 2\Omega t \cos 2\psi$$

is: $I_{27} \alpha \cos^2\Omega t + \beta_r^2 \sin^2\Omega t + \beta_r \cos 2\psi \sin 2\Omega t$ In an analogous way we calculate the beam energy incident on the detector 28:

$$I_{28} \alpha \cos^2\Omega t + \beta_r^2 \sin^2\Omega t - \beta_r \cos 2\psi \sin 2\Omega t$$

Hence, the output of the difference amplifier 29 is:

$$I_{29} \alpha I_{27} - I_{28} = 2\beta_r \cos 2\psi \sin 2\Omega t$$

The light transmitted by the beam splitter 20 having an amplitude $E_3$ passes through the ($\lambda/4$)-plate 21. Its amplitude then is:

$$E_5 \alpha (e^{i(\psi + (\pi/4))} \cos\Omega t, \beta_t e^{-i(\psi + (\pi/4))} \sin\Omega t) e^{-i\omega t}$$

In a way analogous to the above-mentioned one we derive the intensity of the beam incident on the detectors 23 and 24, resp.:

$$I_{23} \alpha \cos^2\Omega t + \beta_t^2 \sin^2\Omega t + \beta_t \cos[(2\psi+(\pi/2))] \sin 2\Omega t$$

and $$I_{24} \alpha \cos^2\Omega t + \beta_t^2 \sin^2\Omega t - \beta_t \cos[(2\psi+\rho/2)] \sin 2\Omega t$$

Hence, the output of the difference amplifier 25 is:

$$I_{25} \alpha I_{24} - I_{23} = 2\beta_t \sin 2\psi \sin 2\Omega t.$$

Figures 9, 11:
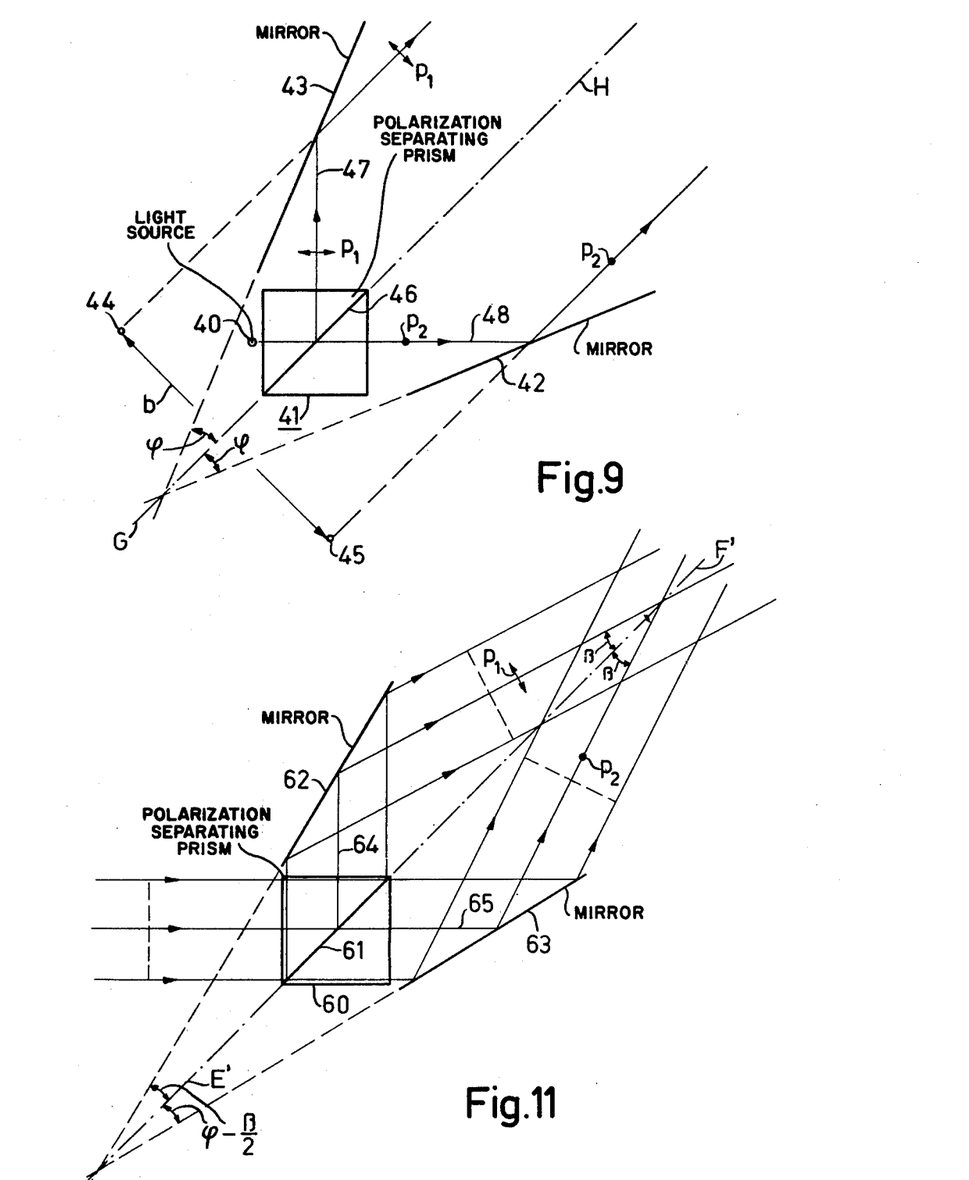
FIG. 9 shows a plan view of a first modification of the apparatus shown in FIG. 1.
FIG. 11 shows a plan view of a first modification of the apparatus shown in FIG. 7.

In the apparatus shown in FIG. 1, the Savart plate may be replaced by a mirror system having polarizing properties, as is shown in FIG. 9. Planepolarized light the plane of polarisation of which rotates at an angular velocity $\Omega$ emanates from a source of light 40. The light falls on a polarisation-separating prism 41 and at the interface 46 of the component prisms, which interface comprises films of alternatively high and low refractive index, is split into two planepolarized sub-beams 47 and 48 which propagate symmetrically with respect to the interface 46 and the directions of polarisation $p_1$ and $p_2$ of which are at right angles to one another. The sub-beams 47 and 48 are reflected at mirrors 43 and 42, respectively, which are arranged symmetrically with respect to the interface 46.

By means of the mirrors 43 and 42 the subbeams 47 and 48 are reflected in a direction parallel to the interface and to the symmetry axis GH, which is the line of intersection of the plane of drawing and the interface 46. The parallel sub-beams may be considered as emanating from two virtual light sources 44 and 45 arranged symmetrically with respect to the axis GH and comparable with the virtual light sources 7 and 8 in the apparatus shown in FIG. 1.

The sensitivity of the apparatus is proportional to the spacing $b$ between the virtual light sources 44 and 45. This sensitivity may be regulated by displacing the mirror 43 or 42 in the direction of the sub-beam 47 or 48, respectively.

The mirror system shown in FIG. 9 may be made more compact by using a modified Koesters prism. In the apparatus shown in FIG. 10 a light source 50 emits plane-polarized light the plane of polarisation of which rotates at an angular velocity $\Omega$. This light enters a modified Koesters prism 51 through one lateral face. The Koesters prism comprises two equal prisms 52 and 53 which have angles of 90°, 60° and 30° and are jointed together to form an equilateral prism 51. In contradistinction to the interface in a normal Koesters prism the interface 54 of the two prisms is polarisation-separating. The beam incident on this interface is split into two sub-beams which propagate symmetrically with respect to the interface and are polarized at right angles to one another. These sub-beams are totally reflected at faces of the prism and emerge, symmetrically with respect to the interface 54, from the prism through the face normal to the interface.

Figure 10:
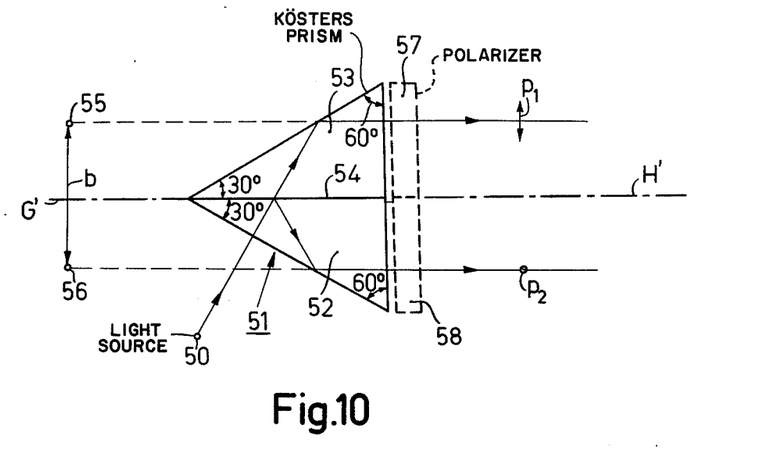
FIG. 10 shows a plan view of a second modification of the apparatus shown in FIG. 1.

The sub-beams may be considered as emanating from two virtual light sources, 55 and 56, arranged symmetrically with respect to the interface 54 and to the line of intersection G' H' of this face with the plane of the drawing. The spacing $b$ of the virtual light sources 55 and 56 is determined by the position of the light source 50 relative to the Koesters prism.

In the apparatus shown in FIG. 7, the Wollaston prism 30 may be replaced by a mirror system having polarising properties, as is shown schematically in FIG. 11. A collimated beam of plane-polarised light the plane of polarisation of which rotates at an angular velocity $\Omega$ emanates from a light source (not shown) and falls on a polarisation separating prism 60. For the sake of simplicity, only three light rays of the collimated beam are shown. At an interface 61 of the component prism, the beam is split into two plane-polarized sub-beams 64 and 65 which propagate symmetrically with respect to the interface and the directions of polarisation $p_1$ and $p_2$ of which are at right angles to one another. The sub-beams are reflected at mirrors 62 and 63 arranged symmetrically with respect to the interface 61.

The angular position of each mirror is chosen so that the collimated sub-beams which are reflected at the mirrors 62 and 63 and have polarisation directions $p_1$ and $p_2$ at right angles to one another are each inclined at an angle $\beta$ to the symmetry axis E'F'. This situation is analogous to that found in the apparatus shown in FIGS. 7 and 8.

The mirror system shown in FIG. 11 may be made more compact by using a modified Koesters prism. In the apparatus shown in FIG. 12, a collimated beam of plane-polarized light the plane of polarisation of which rotates at an angular velocity $\Omega$ enters a modified Koesters prism 70 through one lateral face. The angle of incidence on this phase is $\beta$. The interface 71 of the two component prisms 72 and 73 has been made polarisation-separating. The collimated beam incident on the interface is split into two collimated sub-beams which propagate symmetrically with respect to the interface and are polarised at right angles to one another. After total reflection at lateral faces of the Koesters prism 70 they emerge symmetrycally from the prism through the face normal to the interface. The angle of emergence of the emergent beams is equal to the angle of incidence $\beta$ of the incident beam. The angle between the emergent collimated sub-beams is $2\beta$. This situation is analogous to that found in the apparatus shown in FIG. 11, because the symmetry axis C'D', is comparable to the axis E'F' of FIG. 11.

Figure 12:
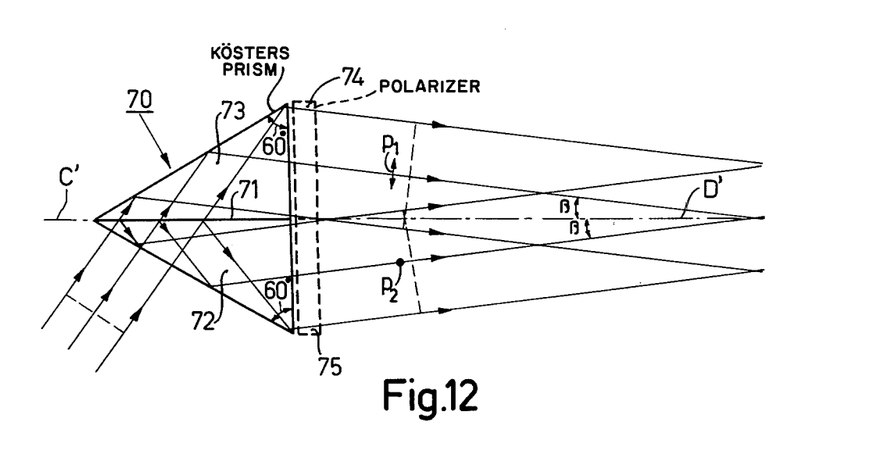
FIG. 12 shows a plan view of a second modification of the apparatus shown in FIG. 7.

In the mirror systems shown in FIGS. 10 and 12 the interfaces 54 and 71 in the Koesters prisms 51 and 70 respectively may be isotropic radiation splitters. In this case, a plane-polarizer must be inserted in each of the sub-beams which emerge from the prism. FIG. 10 shows in broken lines polarisers 57 and 58 the directions of polarisation of which are at right angles to one another. The arrangement of the polarisers is symmetrical with respect to the axis G'H' and they each extend across the width of the sub-beam concerned. The same applies to plane-polarizers 74 and 75 shown in FIG. 12.

The direction of polarisation of the polarisers 57 and 58 respectively, and 74 and 75 respectively must be parallel and normal respectively to the plane of incidence of the sub-beam concerned on the face at which it is totally reflected in order to avoid any inconvenient influence of the anisotropy of the total reflection.

If the position of an object in a plane with respect to two different directions is to be determined, two of the aforedescribed apparatuses of any one type must suitably be combined. By way of example, in the arrangement shown in FIG. 13 two apparatuses as described with reference to FIG. 1 have been combined.

Figure 13:
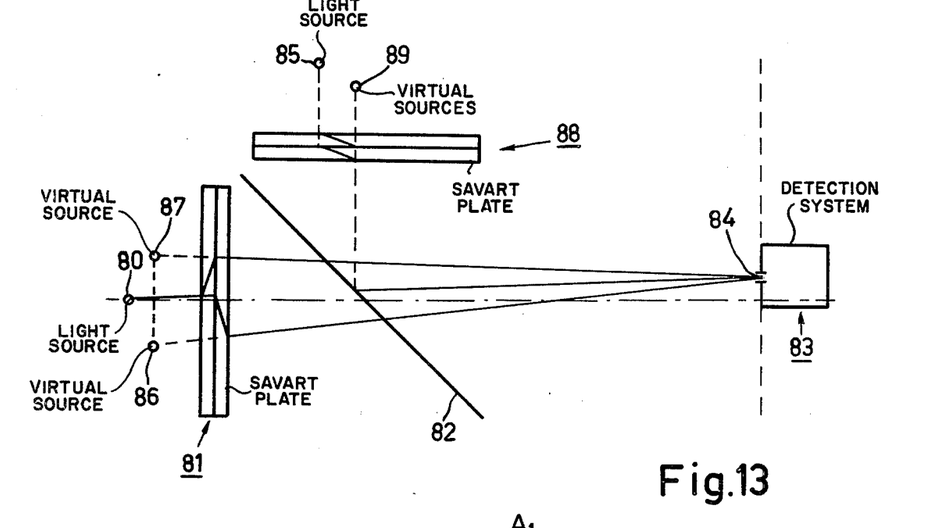
FIG. 13 shows a plan view of a further embodiment of an apparatus according to the invention.

In the arrangement shown in FIG. 13, plane-polarized light the plane of polarisation of which rotates at an angular velocity $\Omega_y$ emanates from a source of light 80 and falls on a Savart plate 81. Through a beam-splitting mirror 82 the plane-polarized sub-beams which emerge from the Savart plate and may be considered as emanating from two virtual point sources 87 and 86 fall on a narrow opening 84 in a detection system 83.

Plane-polarized light the plane of polarisation of which rotates at an angular velocity $\Omega_x$ emanates from a light source 85 and falls on a Savart plate 88. The plane of the Savart plate 88 is at right angles to that of the Savart plate 81. By way of the mirror 82 the plane-polarized sub-beams which emerge from the Savart plate 88 and may be considered as emanating from two virtual point sources fall on the narrow aperture 84 also. The line joining the latter virtual point sources is at right angles to the line joining the point sources 86 and 87, is parallel to the Savart plate 88 and hence is at right angles to the plane of the drawing. In the Figure, the said virtual point sources are designated by the reference numeral 89.

Figure 14:
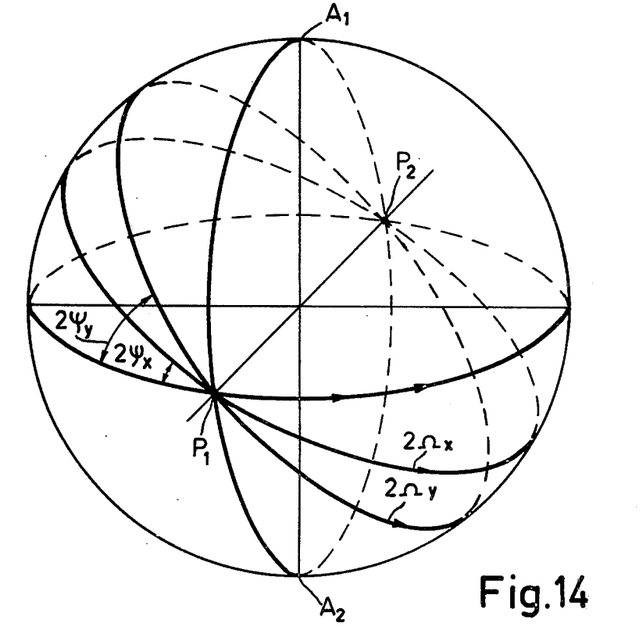
FIG. 14 is a geometrical representation illustrating the operation of the apparatus shown in FIG. 13.

On the Poincare sphere (FIG. 14) the state of polarisation of the four sub-beams is indicated by points on two great circles one of which is tilted relative to the equatorial plane through an angle $2\psi_x$ and the other through an angle $2\psi_y$. The path difference of associated sub-beams is proportional to $2\psi_x$ and to $2\psi_y$, respectively.

The detection system 83 is largely similar to that of FIG. 6. Each of the differential amplifiers 29 and 25 (FIG. 6) will now deliver two signals. In the differential amplifier 29 a signal is produced which is proportional to $(\cos 2\psi_x \sin 2\Omega_x t + \cos s\,\psi_y \sin 2\Omega_y t)$, and in the differential amplifier 25 a signal is produced which is proportional to $(\sin 2\psi_x \sin 2\Omega_x t + \sin 2\psi_y \sin 2\Omega_y t)$.

Each of these signals is applied to a pair of selective amplifiers tuned to the frequency $2\Omega_x$ and $2\Omega_y$ respectively. The position of the object in the co-ordinate directions $x$ and $y$ can be derived from the signals produced in the four selective amplifiers.

It will be clear that the information about the two co-ordinate directions may also be separated by assigning different radiation frequencies to the two sources 80 and 85. In this case the light signals to be detected must be separated by means of colour filters. A disadvantage is, however, that the detection system will then have to be doubled, at least in respect of the light detectors.

Figure 15:
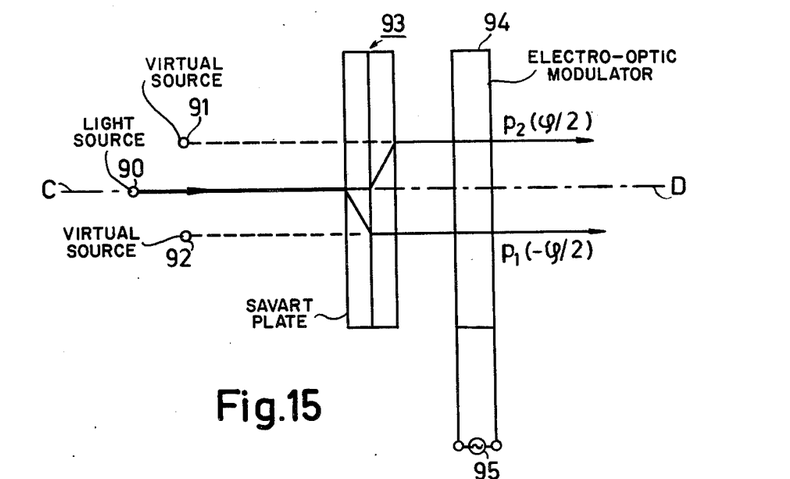
FIG. 15 shows a plan view of another embodiment of an apparatus according to the invention.

In the apparatus shown in FIG. 15, plane-polarized light emanates from a light source 90 and falls on a Savart plate 93. The plane of polarisation of the light incident on the plate is inclined at an angle of 45° to the directions of polarisation $p_1$ and $p_2$ (cf. FIG. 2) of the sub-beams emerging from the plate, which directions are determined by the Savart plate, The sub-beams may be considered as emanating from virtual point sources 91 and 92. The sub-beams which emerge from the Savart plate 93 and are polarized at right angles to one another then pass through an electro-optical modulator 94.

The modulator plate 94 is oriented so that the directions of polarisation $p_1$ and $p_2$ coincide with the principal axes of the double refraction which takes place in the plate 94 when a voltage is applied to the electrodes. From an alternating-voltage source 95 a voltage $U = U_o \sin \Omega t$ is applied to the electrodes so that the field strength is parallel to the axis of the system comprising the Savart plate 93 and the crystal 94. This voltage periodically modulates the sub-beams which are polarised at right angles to one another, thereby periodically imparting to them a phase difference $\phi = \phi \quad \sin \Omega t$.

Figure 16:
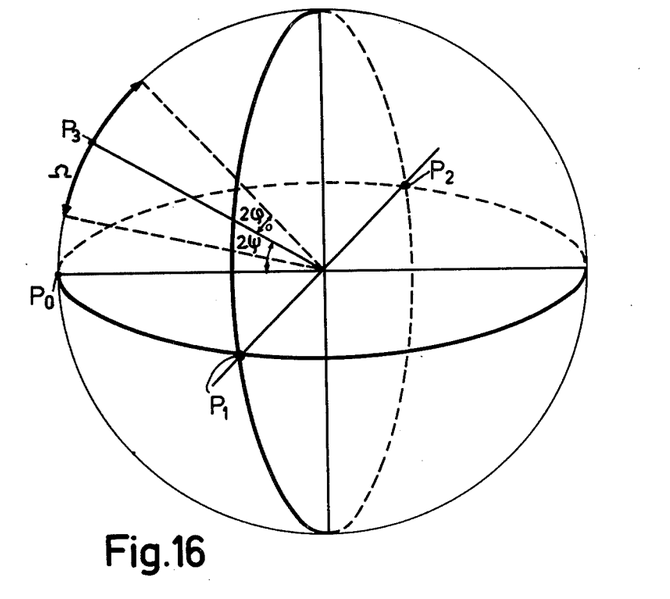
FIG. 16 is a geometrical representation illustrating the operation of the apparatus shown in FIG. 15, and FIGS. 17 and 18 are schematic diagrams that show still further embodiment of an apparatus according to the invention.

On the Poincare sphere (FIG. 16) the plane of polarisation of the radiation source 90 is represented by a point $P_o$ on the equator. The ends $P_1$ and $P_2$ of the diameter $P_1 P_2$ in the equatorial plane represent the directions of polarisation of the sub-beams which emerge from the Savart plate. The phase difference between the sub-beams means a rotation of the point $P_o$ about the axis $P_1 P_2$. A phase difference which differs from zero and occurs outside the axis CD or outside the plane which contains CD and extends at right angles to the plane of the drawing, means a rotation of the point $P_o$ about the axis $P_1 P_2$, for example to the point $P_3$ (cf. FIG. 5). The electro-optical modulator 94, which may be a KDP crystal or a KDDP crystal, imparts an additional harmonic movement: $2 \phi = 2 \phi_o \sin \Omega_t$ to the point $P_3$.

The modulated sub-beams are again detected by means of the detector system shown diagrammatically in FIG. 6. The output signals of the differential amplifiers 25 and 29 now are proportional to $\sin (2 \psi + 2 \phi_o \sin \Omega t)$ and $\cos (2 \psi + 2 \phi_o \sin \Omega t)$ respectively. These signals may be processed in the manner described in copending Netherlands patent application No. 6,716,351 corresponding to U.S. application Ser. No. 187,172, filed Oct. 6, 1971. The anagle $2\psi$ and hence the position of the object are found by this processing.

It will be appreciated that in a manner similar to that in which the arrangement of the FIG. 13 is produced from the combination of two apparatuses as shown in FIG. 1, two arrangements according to FIG. 15 may be combined.

Figure 17:
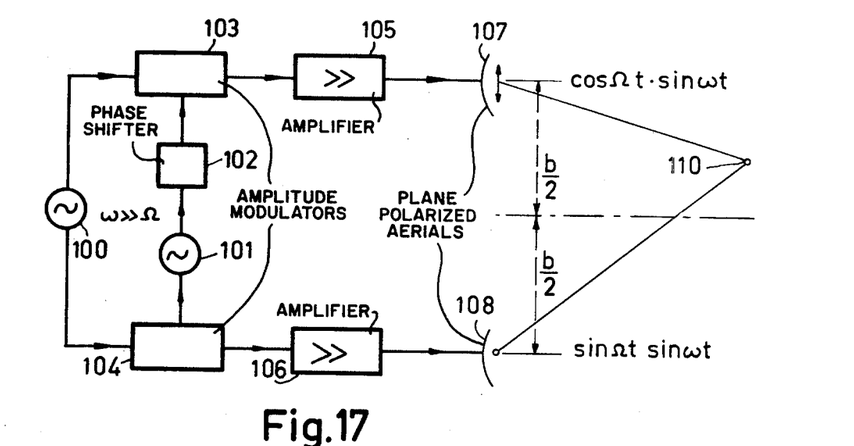

FIG. 17 is a block-schematic diagram of a short-wave transmitter which has the same properties as the optical system shown in FIG. 1. The transmitter comprises an oscillator 100 having an angular frequency $\omega$, a low-frequency oscillator 101 having an annular frequency $\Omega$, two amplitude modulators 103 and 104 and two plane-polarized aerials 107 and 108 which transmit waves polarized at right angles to one another.

The high-frequency oscillations $\omega$ from the oscillator 100 are applied to the modulators 103 and 104. The low-frequency oscillations $\Omega$ from the oscillator 101 are applied directly to the amplitude modulator 104 and through a phase-shifter 102 producing a 90° phase shift to the amplitude modulator 103. The output signal of the modulator 103 is proportional to $\sin \omega t \cos \Omega t$ and that from the modulator 104 is proportional to $\sin \omega t \sin \Omega t$. After amplification in amplifiers 105 and 106 respectively the signals are transmitted through the aerials 107 and 108 with mutually perpendicular directions of polarisation.

The aerials may be compared with the virtual sources in the afore-described optical systems, since the signals polarized at right angles to one another are expressed by the same mathematical formulas in both cases.

The distance $b$ between the aerials 107 and 108 determines the sensitivity of the system. The plane of symmetry which extends at a distance ($b/2$) from each of the aerials at right angles to the line joining them may be compared with the plane of symmetry in the apparatus of FIG. 1 for which CD forms the line of intersection with the plane of the drawing. Just as in the optical apparatuses, a displacement from the plane of symmetry gives rise to a phase difference $2 \psi$ between the signals from the aerials 107 and 108 when detected.

Figure 18:
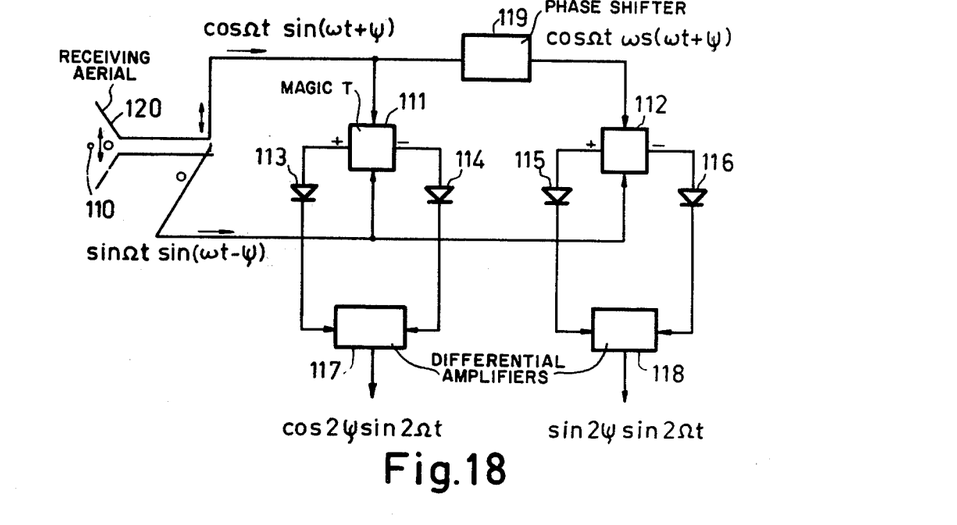

The detection system shown in the block-schematic form in FIG. 18 mainly comprises passive elements. the avoidance of active micro-wave elements in the detection system is an advantage in view of the mobility of the object the position of which is to be determined.

A receiving aerial 120 is arranged at a point 110 outside the plane of symmetry. The components $\cos \Omega t \sin ( \omega t + \psi )$ and $\sin \Omega t \sin ( \omega t - \psi )$, which are polarized at right angles to one another, are separated and applied to a magic T 111. The output signals from the magic T are proportional to $\cos \Omega t \sin ( \omega t + \psi ) + \sin \Omega t \sin ( \omega t - \psi )$ and to $\cos \Omega t \sin ( \omega t + \psi ) - \sin \Omega t \sin ( \omega t - \psi )$, respectively. These signals are analogous to plane-polarised waves the planes of polarisation of which have been rotated through $+45°$ and $-45°$ respectively relative to the planes of polarisation of the plane-polarized components of the waves incident on the aerial 120. The power of the output signals is detected in diodes 113 and 114 respectively. The signals from the diodes are applied to a differential amplifier 117. The output signal of this amplifier is proportional to $\cos 2 \psi \sin 2 \Omega t$.

The components polarized at right angles to one another also are applied to a magic T 112 after one of them has been shifted in phase through 90° in a phase shifter 119. The output signals from the magic T 112 are proportional to $\cos \Omega t \cos ( \omega t + \psi ) + \sin \Omega t \sin ( \omega t - \psi )$ and to $\cos \Omega t \cos ( \omega t + \psi ) - \sin \Omega t \sin ( \omega t - \psi )$ respectively. These signals are analogous to left-circularly polarized components and to right-circularly polarized components respectively of the waves incident on the aerial 120. The power of the output signals is detected in diodes 115 and 116 respectively. The signals from the diodes 115 and 116 are applied to a differential amplifier 118. The output signal of this amplifier is proportional to $\sin 2 \psi \sin 2 \Omega t$. The output signals of the differential amplifiers 117 and 118 have the same shapes as have the output signals of the optical systems. Consequently, the angles $2 \psi$ and hence the position of the aerial 120 may be determined in the same manner as described hereinbefore.

A short-wave transmitter analogous to the optical apparatus of FIG. 15 is obtained by using two phase modulators instead of the amplitude modulators 103 and 104. In this case, the signals from the same low-frequency oscillator must be applied to the modulators in phase opposition. The perpendicularly polarized signals transmitted by the aerials 107 and 108 will then have the forms $\cos ( \omega t + \phi_o \sin \Omega t )$ and $\cos ( \omega t - \phi_o \sin \Omega t )$. The detection system of FIG. 18 remains unchanged, The output signals of the differential amplifiers 117 and 118 now are proportional to $\cos (2 \psi + 2 \phi_o \sin \Omega t)$ and $\sin (2 \psi + 2 \phi_o \sin \Omega t)$ respectively.

It will be clear that in the same manner in which the optical arrangement of FIG. 13 is made up from the combination of two optical apparatuses as shown in FIG. 1, two apparatuses as shown in FIG. 17 may be combined to permit of determining a position in mutually different directions. In this case also, the items of information about the said directions may be separated from one another either by choosing different modulation frequencies or by choosing different carrier frequencies and filtering in the detection system.

What is claimed is:

1. An apparatus for determining the position of an object with respect to a reference position comprising means at said reference position for providing at least two beams of coherent radiation polarized at right angles to one another and having a time dependent complex amplitude difference, both beams illuminating a common area proximate the object, the two beams being spatially separated at the reference position, and a polarization sensitive detection system disposed at the site of the object in the common area.

2. An apparatus as claimed in claim 1, wherein the means for providing the coherent radiation comprises a single radiation source, and means for splitting the radiation from said single radiation source into two virtual sources.

3. An apparatus as claimed in claim 2, wherein said beam splitting means comprises a savart plate.

4. An apparatus as claimed in claim 2, wherein the beam splitting means comprises a Wollaston prism.

5. An apparatus as claimed in claim 2, wherein the beam splitting means comprises a beam splitting mirror in the path of the coherent radiation from the single source for splitting the beam into two sub-beams, an auxiliary mirror in each of the sub-beams, and a beam rotating means in the path of each sub-beam for polarizing the sub-beams at right angles to one another.

6. An apparatus as claimed in claim 5, wherein the angle between each of the auxiliary mirrors and the beam splitting mirror and the position of the polarizing means is such that the beams reflected by the mirror are parallel.

7. An apparatus as claimed in claim 5, wherein the angle between each of the auxiliary mirrors, the beam-splitting mirror and the two beam polarizers is such that the sub-beams reflected by the mirrors converge.

8. An apparatus as claimed in claim 5, wherein the beam-splitting mirror and the two auxiliary mirrors comprise a Koesters prism.

9. An apparatus as claimed in claim 5, wherein the beam-splitting mirror and the two polarizing elements comprise a polarization separating mirror.

10. An apparatus as claimed in claim 8, wherein the polarizing means is inserted in the radiation path of the sub-beams passing out the Koesters prism.

11. An apparatus as claimed in claim 2, wherein the radiation source comprises means for providing plane polarized radiation the plane of polarization of which rotates at a constant angular velocity.

12. An apparatus as claimed in claim 2, wherein the radiation source comprises a source of plane polarized radiation, and an electro-optical modulator means for periodically varying the phase difference of the beams from the beam splitter.

13. An apparatus as claimed in claim 1, wherein the means for providing two spatially separated beams comprises two transmitting antennas, a common oscillator for providing radio frequency oscillations to the antennas, and a coherent modulator connected in series with each antenna.

14. An apparatus as claimed in claim 1, wherein the means for providing the coherent radiation comprises two spatially separated antennas, two coupled oscillators for providing radio frequency oscillations to the antennas and a coherent modulator connected to each antenna.

15. An apparatus as claimed in claim 1, wherein the means for providing the coherent radiation comprises two spaced sources of coherent radiation and a beamsplitter in the path of the radiation from each source for forming two pairs of spaced apparent sources, the sources of each pair being polarized at right angles to one another, an imaginary line joining the sources of one pair being inclined at a predetermined angle to an imaginary line joining the sources of the other pair.

16. An apparatus as claimed in claim 15, wherein the predetermined angle is 90°.

17. An apparatus as claimed in claim 15, wherein the radiation source forming one pair of coherent radiation sources has the same frequency as the radiation source forming the other pair of coherent radiation sources, the modulation frequencies of the two radiation sources being different.

18. An apparatus as claimed in claim 15, wherein the radiation source forming one pair of coherent radiation sources has a different frequency from the radiation source forming the other pair of coherent radiation sources, the modulation frequencies of the two radiation sources being equal.

19. An apparatus as claimed in claim 1, wherein the polarization sensitive detection system comprises means for converting the radiation from the radiation sources into a circularly polarized component of the radiation and a plane polarized component of radiation, at least one detector in the path of the circularly polarized radiation, and at least one additional detector in the path of the plane polarized radiation.

20. An apparatus as claimed in claim 19, further comprising an additional detector in the path of the circularly polarized radiation and a further detector in the path of the plane polarized radiation, means for separating the circularly polarized radiation into two orthogonal components, means for separating the plane polarized radiation into two orthogonally polarized components, the separated components of the circularly polarized beam being directed into a separate detector in that beam, the separated beams of plane polarized radiation each being directed to a separate detector in that beam, and further comprising a differential amplifier connected to each pair of detectors.

* * * * *

UNITED STATES PATENT AND TRADEMARK OFFICE
CERTIFICATE OF CORRECTION

PATENT NO. : 3,881,105
DATED : April 29, 1975
INVENTOR(S) : HENDRIK DE LANG and RENE DANDLIKER It is certified that error appears in the above-identified patent and that said Letters Patent are hereby corrected as shown below:

IN THE SPECIFICATION

Col. 1, line 18, "Koesters" should be --it--;

Col. 3, line 47, "with" should be --which--;

line 50, "and" should be --an--;

Col. 4, line 49, after "both" insert --to--;

Col. 5, line 7, "After" should start a new paragraph;

line 19, "The" should start a new paragraph;

line 38, after "2]" should be -- = --;

Col. 7, line 4, "Koesters" should be --Kosters--;

line 7, "Koes-" should be --Kos- --;

line 15, "Koesters" should be --Kosters--;

line 25, "Koesters" should be --Kosters--;

line 33, before "width" insert --entire--;

UNITED STATES PATENT AND TRADEMARK OFFICE
CERTIFICATE OF CORRECTION

PATENT NO. : 3,881,105
DATED : April 29, 1975

Page - 2

INVENTOR(S) : HENDRIK DE LANG and RENE DANDLIKER

It is certified that error appears in the above-identified patent and that said Letters Patent are hereby corrected as shown below:

Col. 8, line 53, "$\emptyset = \emptyset$" should be --$\emptyset = \emptyset_0$--;

Col. 9, line 11, "anagle" should be --angle--;

line 54, "the" should be --The--;

IN THE CLAIMS

Claim 8, line 3, "Koesters" should be --Kosters--;

Claim 10, line 3, "Koesters" should be --Kosters--;

Signed and Sealed this ninth Day of December 1975

[SEAL]

Attest:

RUTH C. MASON
*Attesting Officer*

C. MARSHALL DANN
*Commissioner of Patents and Trademarks*